United States Patent [19]
Cutler

[11] 3,919,743
[45] Nov. 18, 1975

[54] MAGNETIC FASTENER
[76] Inventor: Alvin H. Cutler, Box 71, Midvale, Idaho 83645
[22] Filed: Nov. 5, 1973
[21] Appl. No.: 413,075

[52] U.S. Cl. ............................. 24/201 B; 24/203
[51] Int. Cl.² ..................................... A44B 17/00
[58] Field of Search ......... 24/201 B, 73 MS; 49/478

[56] References Cited
UNITED STATES PATENTS

| | | | |
|---|---|---|---|
| 2,615,227 | 10/1952 | Hornik | 24/201 B |
| 3,111,735 | 10/1963 | Ellis | 24/201 B |
| 3,141,216 | 7/1964 | Brett | 24/201 B |
| 3,266,112 | 8/1966 | Heckman | 24/201 B |
| 3,372,443 | 3/1968 | Daddona | 24/201 B |
| 3,376,615 | 4/1968 | Heckman | 24/201 B |

FOREIGN PATENTS OR APPLICATIONS

| | | | |
|---|---|---|---|
| 743,967 | 4/1933 | France | 24/201 B |
| 1,217,694 | 5/1960 | France | 24/201 B |
| 1,266,347 | 5/1961 | France | 24/201 B |

Primary Examiner—Bernard A. Gelak
Attorney, Agent, or Firm—John W. Kraft; Charles L. Kraft, II

[57] ABSTRACT

The magnetic fastener comprises a male fastening member having a convexly curved contacted side, and a female fastening member having a concavely curved contact portion. A magnetic fastener may be provided with elongated bars, or with strips substantially coextensive in length with the flap of a garment. A still further embodiment of this invention may include an armature to increase magnetic force resultant from the magnets.

1 Claim, 7 Drawing Figures

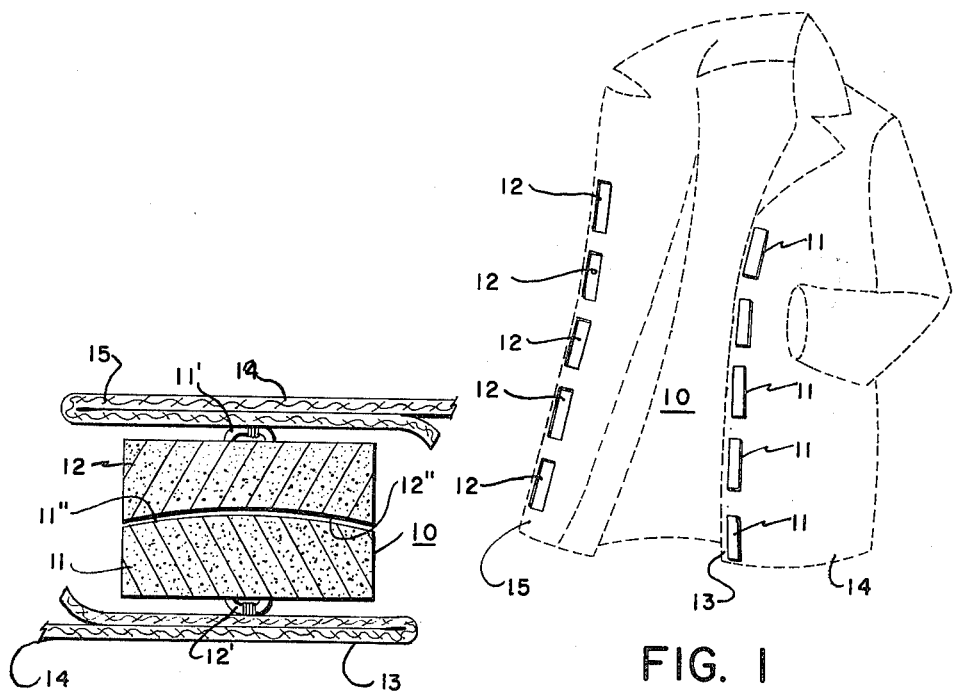
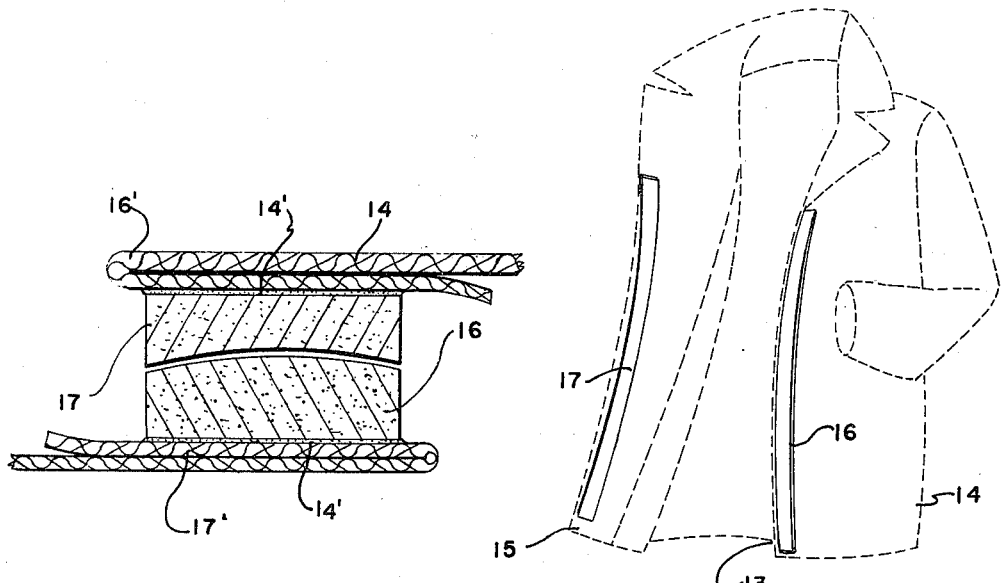

3,919,743

MAGNETIC FASTENER

FIELD OF INVENTION

The present invention relates to a magnetic fastening means for garments and more particularly to magnetic fastening means for wearing apparel and the like.

DESCRIPTION OF THE PRIOR ART

Magnetization has been included in fasteners, including some apparel fasteners; however, these fasteners have been restricted to slide fasteners of the zipper type, compression fasteners having a body about which a resilient jacket may be engaged, snap fasteners and the like. Primary advantage of magnetized fasteners is the convenience of closure, and that handicapped persons may employ such fasteners over conventional types. Application, however, of magnetized fasteners has been limited by the complexity of accompanying closure means, and by the relative lack of holding power.

Accordingly, it is an object of the present invention to provide a magnetized fastener in which simple contact of a magnetized fastener element is sufficient to make a closure.

It is another object of this invention that the present magnetic fastener include elongated bars which may provide sufficient closure and esthetic appeal.

It is still another object of this invention to provide a magnetized strip-like fastener which may be disposed at the terminal edge of a flap opening.

It is a primary object of this invention to provide means for increasing the magnetic force resultant from the magnets, without appreciably increasing their size, by means such as an armature.

These and other objects shall become apparent from the description following it being understood that modifications may be made without affecting the teachings of the invention here set out.

SUMMARY OF THE INVENTION

The magnetic fastener comprises a male fastening member having a convexly curved contacted side, and a female fastening member having a concavely curved contact portion. A magnetic fastener may be provided with elongated bars, or with strips substantially coextensive in length with the flap of a garment. A still further embodiment of this invention may include an armature to increase magnetic force resultant from the magnets.

A more thorough and comprehensive understanding may be had from the detailed description of the preferred embodiment when read in connection with the drawings forming a part of this specification.

BRIEF DESCRIPTION OF THE DRAWINGS

FIG. 1 is a prespective view of a garment shown in broken lines having flaps opened for illustrative purposes showing to advantage the magnetic fastener of this invention.

FIG. 2 is a cross-sectional view of a typical garment fastener of this invention shown in its fastened position attached to the flaps of the garment.

FIG. 3 is a perspective view of further embodiment of the garment having flaps opened for illustrative purposes showing to advantage a further embodiment of the magnetic fastener of this invention.

FIG. 4 is a cross-section view of the further embodiment of the garment fastening magnetic strip of this invention.

DETAILED DESCRIPTION OF THE PREFERRED EMBODIMENT

Figure 5:
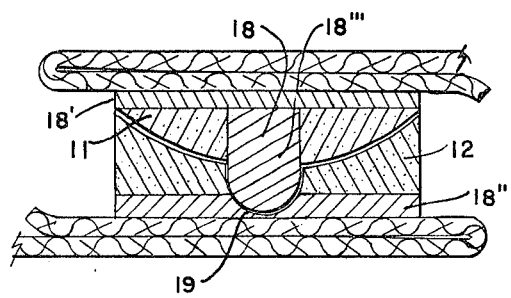
FIG. 5 is a cross-sectional view of a still further embodiment of the fastening strip having an armature.

Referring now to the drawings and more particularly to the FIGS. 1 and 2 of the magnetic fastener for wearing apparel and garment of this invention shown to advantage and generally identified by the numeral 10. The magnetic fastener 10 comprises a male fastening bar 11 and a female fastening bar 12. The male fastening bar or member 11 can be fastened to the exterior terminal side of the terminal edge of a flap 13 of a garment 14. Accordingly, the female bar 12 is fastened to the interior terminal edge of the complimentary flap 15 of a fastening loop 11' and 12', respectively, in the manner of garment butttons and the like. The bars 11 and 12 may be bonded to the garment 14 by means such as adhesives 14' as seen in the FIG. 4.

The male bar 11 has a cross-sectional convexly configured contact face 11" which is matable with a concavely configured contact face 12" in the female bar 12. The active or male bar 11 is magnetized to apply lines of force for attracting to the neutral or female bar 12. Accordingly, the male bar 11 must be made of a magnetizable material. This material may be of a ferric magnetic metal, or of a magnetizable flexible material such as neoprene. In operation the flaps 13 and 15 of the garment 14 may be closed in the manner of conventional closing. The bars 11 and 12 may be contacted with each other to apply necessary magnetic flux from the male bar 11 to the female bar 12. It is to be understood that the further embodiment of the garment magnetic fastener 10 may include complimentarily magnetized bars 11 and 12.

A further embodiment of this invention includes a male fastener strip 16 and a female fastener strip 17. The male fastener strip 16 is fastened to the exterior terminal edge of the flap 13 of a garment 14 as set out above. Accordingly, the female strip 17 is fastened to the interior terminal side of the complimentary flap 15 of the garment 14. Each of the strips 16 and 17 may be provided with hem strips 16' and 17', respectively, in the manner of commonly known fabric or elastic attachments. The strips 16 and 17 may also be bonded to the garment 14 by other means such as adhesives and the like. The strips 16 and 17 of the further embodiment should be fabricated of a flexible magnetizable material such as neoprene. Operation of the strips 16 and 17 is substantially identical to the operation of the bars 11 and 12 set out above. Like the bar type fasteners 11 and 12, the strips fasteners 16 and 17 may be matable concavely and convexly configured respectively.

Magnetic flux of the fastening means 10 in either of the embodiments set out above may be increased by the inclusion of an armature 10. Referring to the transverse cross-section of FIG. 5, a typical armature 18 may comprise ferrite laminations 18' and 18" disposed on the flap contacting side of the male fastening member 11 and the female fastening on member 12, respectively, and ferrite core 18''' mounted centrally in the male fastening member 11. The laminations 18' and 18'' may be bonded to the members 11 and 12 by any of a variety of means such as adhesive, themobonding and the like, and may be provided on the side opposite the members 11 and 12 with the means for fastening the members 11 and 12 to fabric. The core 18''' is disposed through the male fastening member 11 to the lamination 18', and projecting distally from the apex of convex curvature of the male fastening member 11. The female fastening member 12 is provided with a centrally disposed groove 19 which communicates the lamination 18'' with the contact face 12''. In operation the core 18''' is disposed into the groove 19 to contact the core 18''' with the laminations 18' and the fastener 10 is closed. It may be seen that the core 18''' or groove 19 facilitates engagement of the fasteners 11 and 12. Magnetic force may be optimized further if the core 18''' is operable to space the contact faces 11'' and 12'' distally apart.

Figure 6:
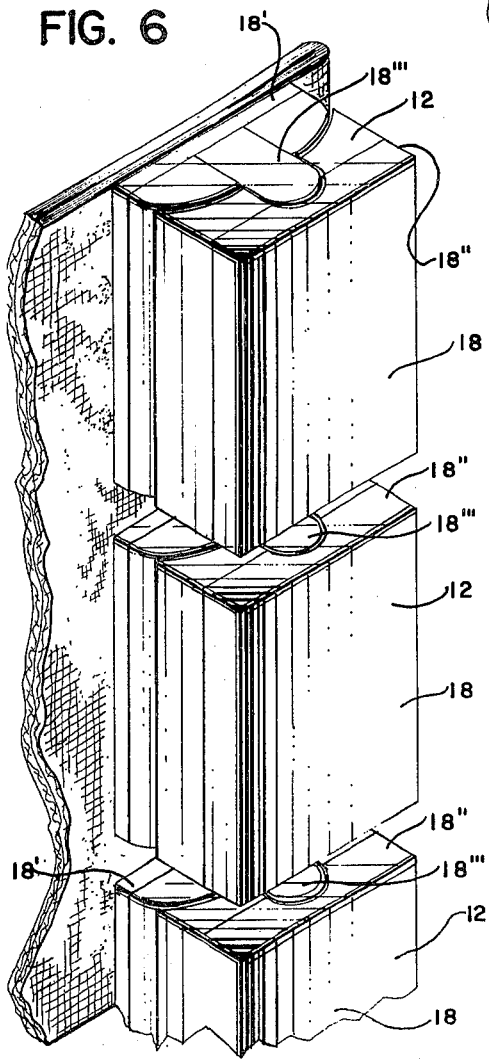
FIG. 6 is an exploded fragmentary perspective view of an armature fabricated co-extensively with the male and female fastening members.
Figure 7:
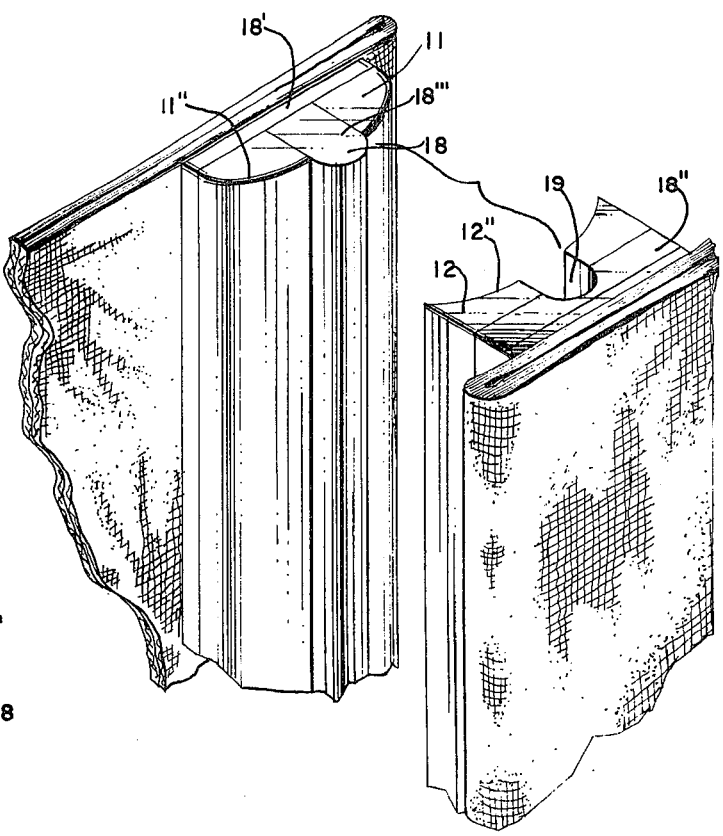
FIG. 7 is a fragmentary view of an armature fabricated in sections.

As shown in FIG. 6, the lamination 18' and 18'' and the core 18''' may be fabricated co-extensively with the male and female fastening members 11 and 12. In embodiments of the fastening means 10 fabricated of flexible material, the laminations 18' and 18'' may be fabricated to a flexible ferrite foil, and the core 18''' may be fabricated to a flexible ferrite filament. As shown FIG. 7, the armature 18 may also be fabricated in sections, either unconnected or pivotally connected.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodies therein. Hence, it is intended that the scope of the invention be limited only to the extent indicated in the appended claims.

I claim:

1. A magnetic fastener for a garment comprising:

a plurality of elongated bar-like male fastening members having faces fastened to a surface of a flap of said garment along a common longitudinal axis, the opposite face of each of said members being convexly curved in a transverse direction and being elongated along said longitudinal axis; and a plurality of elongated bar-like female fastening members having faces fastened to a surface of an overlapping complementary mating flap of said garment along a common longitudinal axis and each having the opposite face concavely curved in a transverse direction and being elongated along said longitudinal axis, one of said fastening members being magnetized and the opposite member being fabricated of a magnetically attractable material, said magnetized fastening member being provided with an armature projecting out of its respective face, and said opposite member having a groove to receive said armature, the curved faces adapted to contact each other in fastened position.

* * * * *